US010601291B2

(12) United States Patent
Mao et al.

(10) Patent No.: US 10,601,291 B2
(45) Date of Patent: Mar. 24, 2020

(54) LINEAR MOTOR

(71) Applicants: Lubin Mao, Shenzhen (CN);
Rongguan Zhou, Shenzhen (CN);
Jiwei Ge, Shenzhen (CN)

(72) Inventors: Lubin Mao, Shenzhen (CN);
Rongguan Zhou, Shenzhen (CN);
Jiwei Ge, Shenzhen (CN)

(73) Assignee: AAC Technologies Pte. Ltd.,
Singapore (SG)

( * ) Notice: Subject to any disclaimer, the term of this patent is extended or adjusted under 35 U.S.C. 154(b) by 179 days.

(21) Appl. No.: 15/412,089

(22) Filed: Jan. 23, 2017

(65) Prior Publication Data

US 2018/0026507 A1 Jan. 25, 2018

(30) Foreign Application Priority Data

Jul. 21, 2016 (CN) .................... 2016 2 0773856 U

(51) Int. Cl.
*H02K 33/02* (2006.01)
*H02K 33/16* (2006.01)
*B06B 1/04* (2006.01)

(52) U.S. Cl.
CPC ............. *H02K 33/02* (2013.01); *B06B 1/045* (2013.01); *H02K 33/16* (2013.01)

(58) Field of Classification Search
CPC .......... H02K 33/16; H02K 1/34; H02K 35/02; B06B 1/04
USPC .......... 310/12.16, 15, 17, 23, 25; 340/384.7, 340/388.1, 396; 381/396, 412, 420, 421
See application file for complete search history.

(56) References Cited

U.S. PATENT DOCUMENTS

| | | | | |
|---|---|---|---|---|
| 6,618,487 B1 * | 9/2003 | Azima | ..................... | H04R 1/24 381/152 |
| 6,897,573 B1 * | 5/2005 | Shah | .................... | H02K 7/1876 290/1 A |
| 2009/0184589 A1 * | 7/2009 | Yamagishi | ............. | H04R 9/066 310/12.16 |
| 2010/0315185 A1 * | 12/2010 | Kagami | .................. | B06B 1/045 335/229 |
| 2011/0187209 A1 * | 8/2011 | Pu | .......................... | H02K 33/04 310/17 |
| 2012/0184883 A1 * | 7/2012 | Song | ...................... | A61H 23/02 601/46 |
| 2013/0106205 A1 * | 5/2013 | Clamme | ................ | H02K 33/02 310/28 |

(Continued)

FOREIGN PATENT DOCUMENTS

EP 2161448 A1 * 3/2010 ............. F04B 17/042
WO WO-2016114384 A1 * 7/2016 ............. H02K 33/02

*Primary Examiner* — Quyen P Leung
*Assistant Examiner* — Eric Johnson
(74) *Attorney, Agent, or Firm* — IPro, PLLC

(57) ABSTRACT

A linear motor is disclosed. A linear motor includes a housing having a bottom wall, a cover plate opposite to the bottom wall, and a side wall connecting the bottom wall with the cover plate for forming an accommodation space. The linear motor further includes a stator, and a vibrator accommodated in the accommodating space. One of the bottom wall and the cover plate is connected with the stator, and the other supports the vibrator. Further, the side wall comprises a first connecting part connecting with the bottom wall, a second connecting part connecting with the cover plate, and an elastic arm connecting the first connecting part with the second connecting part.

10 Claims, 2 Drawing Sheets

(56) References Cited

U.S. PATENT DOCUMENTS

| | | | |
|---|---|---|---|
| 2014/0054984 A1* | 2/2014 | Tang | H02K 33/18 310/28 |
| 2014/0252890 A1* | 9/2014 | Lee | H02K 33/16 310/25 |
| 2016/0094115 A1* | 3/2016 | Okawa | A61C 17/3445 310/25 |
| 2016/0212547 A1* | 7/2016 | Kang | B06B 1/045 |
| 2018/0001348 A1* | 1/2018 | Ishii | B06B 1/045 |
| 2019/0182599 A1* | 6/2019 | Yoshimura | H02K 33/18 |

* cited by examiner

LINEAR MOTOR

FIELD OF THE INVENTION

The invention is related to the technology of vibrators, and especially relates to a linear motor for providing tactile feedbacks.

DESCRIPTION OF RELATED ART

The portable consumer electronic products are favored by more and more people along with development of the electronic technologies, such as mobile phone, handheld game player, navigation unit or handheld multimedia entertainment equipment, etc. The vibration feedback, which is taken as one feedback form of the portable consumer electronic product, has been extended to provide the tactile feedback related to application program and scene, etc. gradually from the initial and most fundamental coming call prompt, etc. While the motor is the primary element offering vibration feedback in the mobile equipment and usually comprises a rotary motor, a piezoelectric motor, a linear motor, etc., wherein the linear motor has the absolute advantage on the aspect of offering the tactile feedback related to the application program and the scene due to its small volume, long service life, low power dissipation, rapid response, etc.

A related linear motor in relevant technology usually comprises a housing having an accommodating space, a stator, an elastic part and a vibrator which are accommodated in the accommodating space. One of the stator and the vibrator comprises coils, and other comprises a magnet; magnetic field force shall be generated when the AC power supply is offered to the coils and the coils interacts with the magnet; and the vibrator shall implement reciprocating vibration in presence of support of the elastic part. However, a plate spring serves as the elastic part in the linear motor of relevant technology; the vibrator also comprises a counterweight welded with the plate spring. The majority of the counterweight is required to cut off in order to keep away from the spring during vibration; while the vibration sensitivity of the motor may become weak because the motor becomes light if the space is kept still.

Therefore, it is necessary to provide an improved vibration motor to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain this disclosure, not intended to limit this disclosure.

Figure 1:
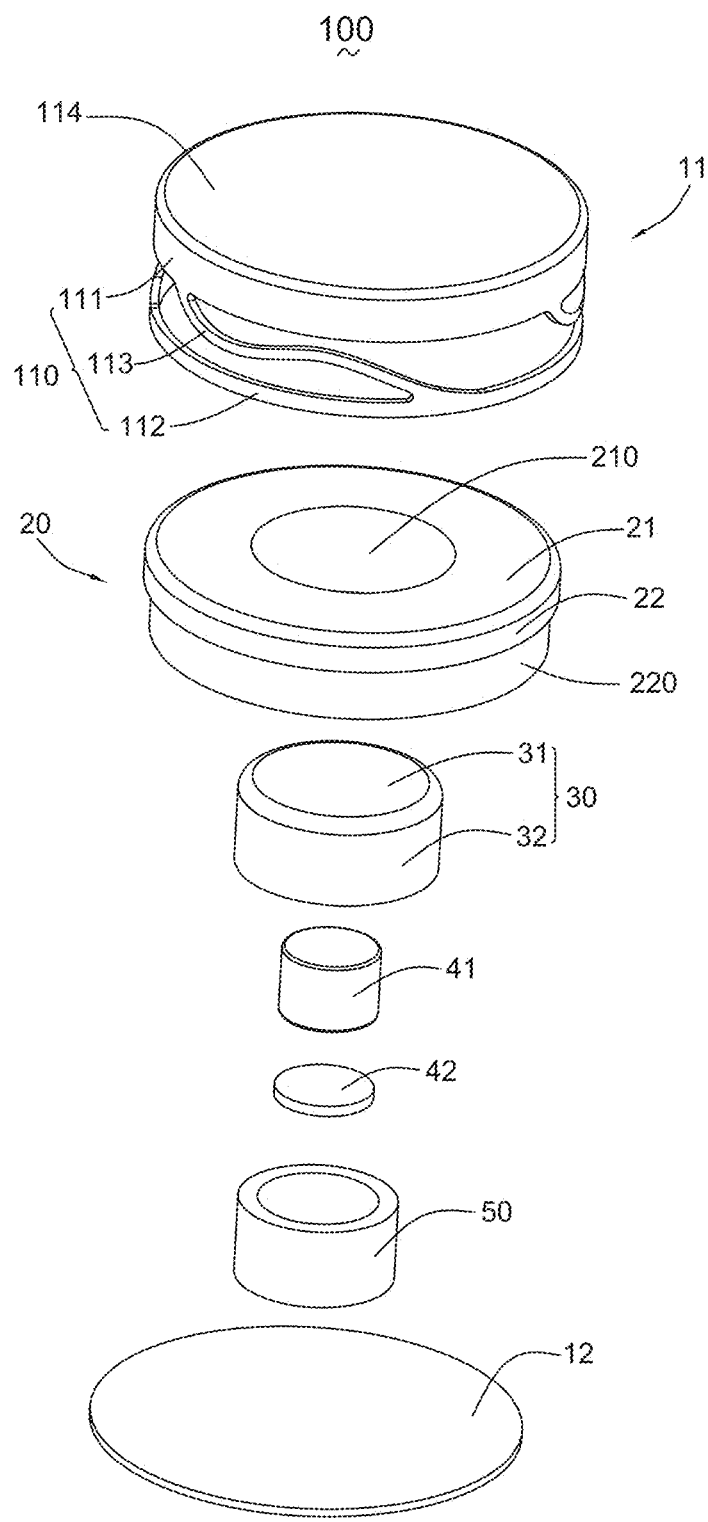
FIG. 1 is an isometric and exploded view of a linear motor in accordance with an exemplary embodiment of the present disclosure.
Figure 2:
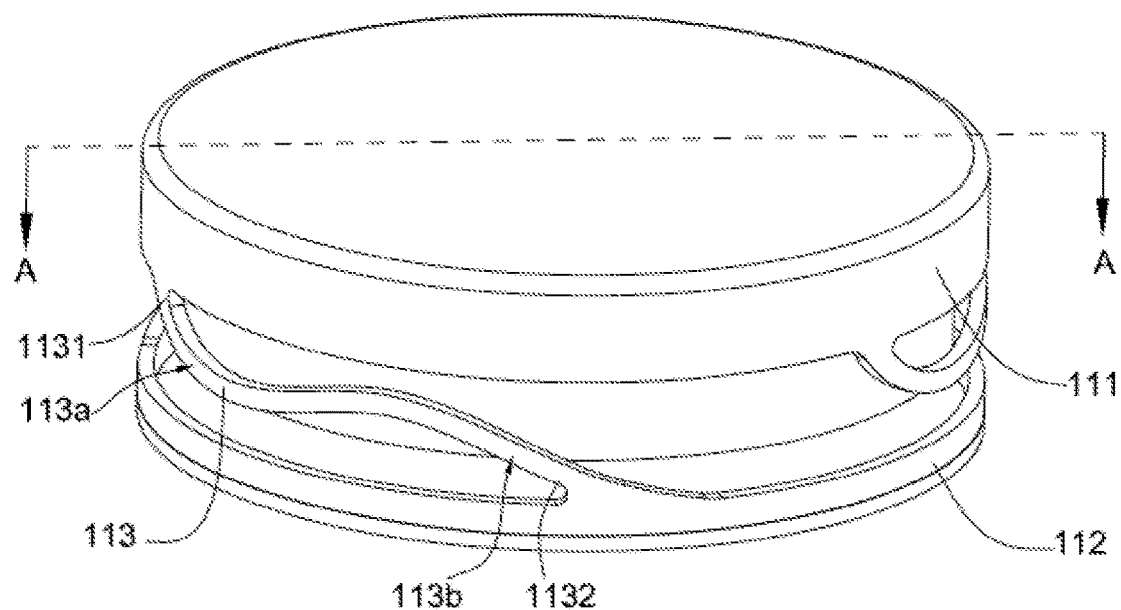
FIG. 2 is an assembled view of the linear motor in FIG. 1.
Figure 3:
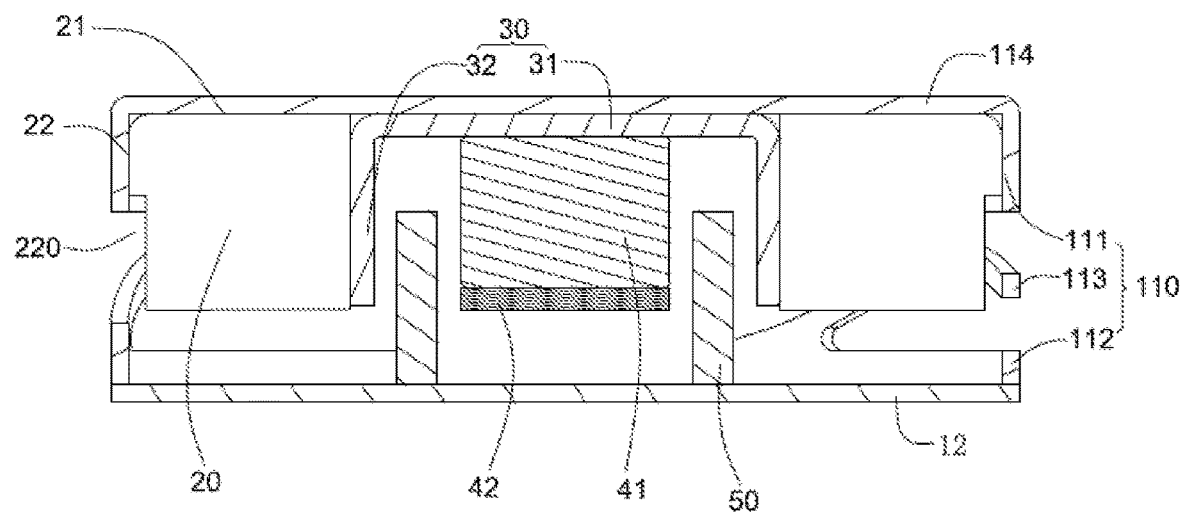
FIG. 3 is a cross-sectional view of the linear motor taken along line A-A in FIG. 2.

Referring to FIGS. 1-3, a linear motor 100, in accordance with an exemplary embodiment of the present disclosure, comprises a housing having an accommodating space, a stator and a vibrator both accommodated in the accommodating space. Moreover, the housing is presented as a cylinder wholly in this embodiment.

The housing comprises a bottom wall 114, a cover plate 12 opposite to the bottom wall 114, and a side wall 110 connecting the bottom wall 114 with the cover plate 12. One of the bottom wall 114 and the cover plate 12 is applied to support the stator, and the other is applied to support the vibrator. In this embodiment, the vibrator is connected to the bottom wall; the stator is fixed on the cover plate 12. The vibrator also can be connected to the cover plate and the stator can also be fixed on the bottom wall 114. The side wall 110 comprises a first connecting part 111 which connects with the bottom wall 114, a second connecting part 112 which is connected with the cover plate 12 and multiple elastic arms 113 which connect the first connecting part 111 with the second connecting part 112. As shown in FIGS. 2 and 3, it is clearly shown that the first connecting part 111 and the second connecting part 112 are both integrally formed with the elastic arms 113 to form the side wall 110. The first connecting part 111 and the second connecting part 112 are presented as the ring structures; therefore, the fixed areas between the first connecting part 111 and the bottom wall 114 and between the second connecting part 112 and the upper cover 12 can be increased, and the housing would be firmer. The elastic arm 113 includes a first end 1131 and a second end 1132, and also includes a first curve arm 113a protruding towards the cover plate 12, and a second curve arm 113b connecting with the first curve arm 113a and protruding away from the cover plate 12, with the first curve arm 113a extending from the first end 1311 and the second curve 113b extending from the second end 1132. The first end 1131 of the elastic arm 113 is connected with the first connecting part 111, and the second end 1132 is connected with the second connecting part 112 and presented in S-shape or other shapes; and the orthographic projection of the elastic arm 113 on the first connecting part 111 or the second connecting part 112 is positioned in the outline scope of the first connecting part 111 or the second connecting part 112. The orthographic projection of the first end 1131 on the cover plate 12, the orthographic projection of the second end 1132 on the cover plate 12 and the orthographic projection of the stator 50 on the cover plate 12 do not overlap with each other, with the vibrator spaced apart from the elastic arm 113. The first curve arm 113a is smoothly connected with the second curve arm 113b. The elastic housing shall be available, and no spring piece is required in presence of the elastic arm 113; therefore, the inner space of the linear motor can be saved. Moreover, the bottom wall 114 and the side wall 110 are formed integrally in this embodiment.

The vibrator comprises a magnetic bowl 30 which is arranged on the bottom wall 114 fixedly, a magnet 41 which is adhered to the bottom of the magnetic bowl 30 and forms a magnetic gap with the magnetic bowl 30, a pole plate 42 covering the magnet 41 and a counterweight 20 surrounding the magnetic bowl 30. Specifically, the magnetic bowl 30 comprises a bowl bottom 31 which connects with the bottom wall 114 and a bowl wall 32 extending toward the direction of the cover plate 12 from the bowl bottom; the counterweight 20 is held between the bowl wall 32 of the magnetic bowl and the side wall 110 of the housing, that is, the counterweight 20 is provided with a through hole 210 in which the magnetic bowl 30 is arranged. Further, the counterweight 20 comprises an upper surface 21 and a side surface 22 which is connected with the upper surface 21 and adjacent to the upper surface 21; the upper surface 21 is connected with the bottom wall 114 fixedly, and the side surface 22 is connected with the side wall 110 fixedly. The counterweight 20 is provided with an avoiding part 220 which sinks toward the direction far away from the side wall 110 from the side surface 22 and offers avoiding space to the elastic arm 113 in this embodiment. The avoiding part 220 is arranged around the counterweight 20 and applied to abdication of the elastic arm 113; therefore, the vibration sensitivity of the linear motor 100 can be improved due to the mass to be maximized of the counterweight 20.

Further, the counterweight 20 is welded and fixed with the bottom wall 114 and the first connecting part 111 together; thus, the counterweight 20 can be connected with the housing more firmly.

The stator comprises coils 50 which is arranged on the cover plate 12 fixedly, wherein the coils 50 are hollow circular structures surrounding the magnet 41 after being placed in the magnetic gap. With the magnet 41 sheathed in the cylindrical-shape coils 50, the vibrator vibrates in a direction perpendicularly to the bottom wall 114.

The housing is also taken as the spring in this embodiment, and can be equipped with one housing sleeve outside the housing additionally in other embodiments. Therefore, the housing can be used as the spring only.

Compared with the relevant technology, the linear motor 100 in the present disclosure is provided with the housing having a deformable elastic arm 113 structure; therefore, on one hand, the problem that great vibration space shall be occupied by the elastic arm 113 because the majority of the counterweight 20 is required to cut off in order to keep away from the elastic arm 113 during vibration in relevant technology; on the other hand, the size of the counterweight 20 for keeping away from the elastic arm can be minimized compared with design of traditional device; at this time, the mass of the counterweight 20 can be maximized if the space is kept still, and the vibration sensitivity of the motor can be improved greatly.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear motor comprising:
   a housing including a bottom wall, a cover plate opposite to the bottom wall, and a side wall connecting the bottom wall with the cover plate for forming an accommodation space;
   a stator;
   a vibrator accommodated in the accommodating space and vibrating in a direction perpendicularly to the cover plate; wherein
   the cover plate is fixed to the stator, and the bottom wall supports the vibrator;
   the side wall comprises a first connecting part connecting with the bottom wall, a second connecting part connecting with the cover plate, and an elastic arm connecting the first connecting part with the second connecting part, the first connecting part and the second connecting part are both integrally formed with the elastic arm to form the side wall; and,
   the vibrator comprises a magnetic bowl arranged on the bottom wall fixedly, a magnet attached to a bowl bottom of the magnetic bowl and forming a magnetic gap with the magnetic bowl, a pole plate attached to the magnet, and a counterweight surrounding the magnetic bowl; the counterweight comprises an upper surface and a side surface connecting with the upper surface and adjacent to the upper surface; the upper surface is attached to the bottom wall fixedly; and the side surface is attached to the side wall fixedly; the counterweight is provided with an avoiding part which partially sinks along a direction away from the side wall from the side surface and offers an avoiding space to the elastic arm.

2. The linear motor as described in claim 1, wherein the bottom wall and the side wall are formed integrally.

3. The linear motor as described in claim 1, wherein the magnetic bowl comprises the bowl bottom connecting with the bottom wall and a bowl wall extending toward the cover plate from the bowl bottom; and the counterweight is located between the bowl wall of the magnetic bowl and the side wall of the housing, and spaced apart from the elastic arm.

4. The linear motor as described in claim 3, wherein the stator comprises coils arranged on the cover plate fixedly and surrounding the magnet in the magnetic gap.

5. The linear motor as described in claim 1, wherein the counterweight and the bottom wall are welded and fixed together.

6. The linear motor as described in claim 1, wherein the first connecting part and the second connecting part are configured to be ring structures.

7. The linear motor as described in claim 1, wherein the elastic arm comprises a first curve arm protruding towards the cover plate, and a second curve arm connecting with the first curve arm and protruding away from the cover plate, with the first curve arm extending from the first end and the second curve arm extending from the second end.

8. The linear motor as described in claim 7, wherein the first curve arm is smoothly connected with the second curve arm.

9. The linear motor as described in claim 1, wherein the orthographic projection of the elastic arm on the first connecting part or the second connecting part is positioned in an outline scope of the first connecting part or the second connecting part.

10. The linear motor as described in claim 1, wherein the elastic arm is spaced apart from the vibrator, the elastic arm comprising a first end connecting to the first connecting part and a second end connecting to the second connecting part, and an orthographic projection of the first end on the cover plate, an orthographic projection of the second end on the cover plate and an orthographic projection of the stator on the cover plate do not overlap with each other.

* * * * *